US005930266A

United States Patent [19]

Ramsey et al.

[11] Patent Number: 5,930,266

[45] Date of Patent: Jul. 27, 1999

[54] MULTIPLEXING/DEMULTIPLEXING AN FDM OF RF SIGNAL CHANNELS

[75] Inventors: Winston Thomas Ramsey, Cobnor; John Arnold Vaughan, Chichester; Gary Raymond Cobb, Waterlooville, all of United Kingdom

[73] Assignee: Matra Marconi Space UK Limited, Stanmore, United Kingdom

[21] Appl. No.: 08/851,279

[22] Filed: May 5, 1997

[30] Foreign Application Priority Data

May 23, 1996 [GB] United Kingdom .................... 9610867

[51] Int. Cl.$^{6}$ .......................... H04J 1/04

[52] U.S. Cl. .......................... 370/480; 333/110; 333/208; 333/227

[58] Field of Search .......................... 370/480, 497, 370/481, 486, 485, 488; 333/110, 126, 129, 132, 134, 135, 202, 208, 227

[56] References Cited

U.S. PATENT DOCUMENTS

| | | | |
|---|---|---|---|
| 3,839,688 | 10/1974 | Shimada et al. | 333/110 |
| 4,129,840 | 12/1978 | Mok | 333/208 |
| 4,326,288 | 4/1982 | Fettweis | 370/480 |
| 4,633,180 | 12/1986 | Biehl et al. | 333/227 |
| 4,652,844 | 3/1987 | Brambilla | 333/208 |
| 4,780,694 | 10/1988 | Kich et al. | 333/208 |
| 4,792,771 | 12/1988 | Siu | 333/208 |
| 5,184,098 | 2/1993 | Kich et al. | 333/110 |
| 5,691,987 | 11/1997 | Friederichs | 370/480 |

FOREIGN PATENT DOCUMENTS

| | | |
|---|---|---|
| 2285540 | 7/1995 | United Kingdom . |

*Primary Examiner*—Douglas W. Olms
*Assistant Examiner*—Tuan Ho

[57] ABSTRACT

A multiplexer comprises a number of directional filters 17$_n$ connected to a transmission line feeding an antenna 2, 3. Signals to be multiplexed fed to the filters 17$_n$ may be sent via respective switches 16$_n$. Unlike prior multiplexers where each directional filter defines a respective channel of the multiplex, the channels of the multiplexer of the invention, apart from one at the end, are defined by the band pass response of one directional filter and the band stop response of another directional filter, since the band pass responses of the directional filters from the input connected to the switch to the output connected to the transmission line, and the corresponding band stop responses between the two output ports connected to the transmission line, overlap each other. The same arrangement may be used for demultiplexing.

11 Claims, 6 Drawing Sheets

MULTIPLEXING/DEMULTIPLEXING AN FDM OF RF SIGNAL CHANNELS

This invention relates to multiplexing/demultiplexing an FDM of RF signal channels.

The invention is especially concerned with signal processing on artificial communications satellites, and particularly output multiplexing.

Referring to FIG. 1, a typical on-board system comprises a receiving antenna 1 and two transmitting antennas 2, 3. The transmitting antennas may point to different regions of the earth. The uplink signal received by the receiving antenna will be an FDM (FIG. 2) of n channels of a certain bandwidth and, after amplification by low noise amplifier 4, demultiplexer 5 separates the signal into n channels $\mathbf{6}_1$-$\mathbf{6}_n$, (usually equispaced frequency slots) which are individually amplified by amplifiers such as traveliing wave tubes $\mathbf{7}_1$—$\mathbf{7}_n$. These signals are then switched between output multiplexers 8, 9 feeding the antennas 2, 3, by means of switches $\mathbf{16}_1$–$\mathbf{16}_n$, which are connected to the travelling wave tube amplifiers $\mathbf{7}_1$–$\mathbf{7}_n$ on the one hand and to the output multiplexers 8, 9 on the other hand by individual waveguide sections $\mathbf{11}_1$–$\mathbf{11}_n$ and $\mathbf{12}_1$–$\mathbf{12}_n$, $\mathbf{13}_1$–$\mathbf{13}_n$.

Referring to FIG. 3, which shows the circuit of the output multiplexer 8, the signal channels are multiplexed by launching electromagnetic radiation from each waveguide $\mathbf{12}_1$–$\mathbf{12}_n$ into a waveguide manifold 13, short circuited at the end 13*a* at a respective precise distance from the short circuited end which is related to the wavelength, in order to produce standing waves in the waveguide 13. Each channel is filtered via a respective two-port filter $\mathbf{14}_1$–$\mathbf{14}_n$. The problem with such a design is that the filters have to be tuned in situ because the tuning of each filter affects the tuning of the others.

In order to overcome this, as well as to reduce the weight of the satellite, the use of directional filters (FIG. 4, 5) has been proposed. With this arrangement, each travelling wave tube amplifier $\mathbf{7}_1$–$\mathbf{7}_n$ can be alternately connected to one of two ports on a single output multiplexer 15 by means of respective switches $\mathbf{16}_1$–$\mathbf{16}_n$. In the first switch position, the signals enter the directional filter by one input port a, producing travelling waves propagating along the waveguide 18 of the output multiplexer 15, as shown in FIG. 5, in a right hand direction to feed the antenna 2, while the left hand side of the waveguide 18 is terminated by the second antenna 3. In the other switch position, the signals enter the directional filters by means of the other input port b, producing travelling waves propagating along the waveguide 18 of the output multiplexer 15 in the opposite direction to feed the second antenna 3, while the right hand side of the waveguide 18 is still terminated by the first antenna 2.

FIG. 6 shows the pass-band response of the filters when signals are fed in at port a for feeding antenna 2. The filter pass-bands are contiguous. The pass-band response (from a to d, and b to c) and band stop response (from a to b, and c to d) of one of the filters 17 (shown in FIG. 7*a*) are shown in more detail in FIGS. 7*b* and 7*c*, respectively. The pass-band response of the filters is the same when signals are fed in at port b for feeding antenna 3.

In the interests of maximizing traffic carried by the on-board satellite signal processing system, each channel is defined by a band pass filter with steeply descending transition regions in order to allow closely spaced narrow bands. In order to achieve this, directional filters employing a succession of cavities with more than one resonance per cavity has been disclosed (EP 0 249 612 B) with a quasi-elliptic response. However, it is a fundamental law that for minimum phase networks the narrower the bandwidth, the greater the variation of group delay across that bandwidth.

The invention provides a multiplexer for producing an FDM of RF signal channels, comprising a transmission line, a plurality of directional filters by means of which respective signals can be coupled onto the transmission line, wherein at least one of the channels of the resulting FDM on the transmission line is defined at one edge by the band pass response of the directional filter coupling the respective signal onto the transmission line and at the other edge by the band stop response of another directional filter for coupling another signal onto the transmission line.

The pass band response of each directional filter may now be greater than the signal channel, permitting a reduced variation of group delay across the bandwidth.

The directional filters may be implemented as cavity resonators. An input and output dual-mode cavity resonator may be used to provide separate coupling paths into and out of a pair of quadruple-mode cavities which contain all the necessary mutual and cross-couplings to produce a desired elliptic response via longitudinal coupling slots only.

Multiplexers constructed in accordance with the invention will now be described, by way of example, with reference to the accompanying drawings, in which.

Figure 5:
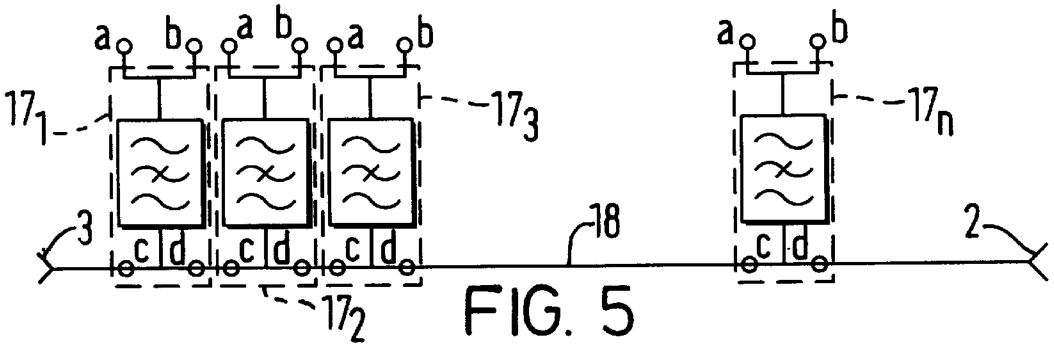
FIG. 5 shows the circuit of the directional output multiplexer of FIG. 4.
Figure 7A:
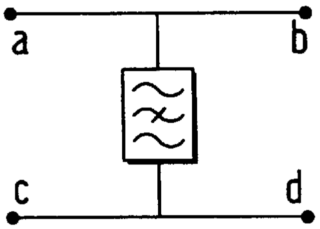
Figure 7B:
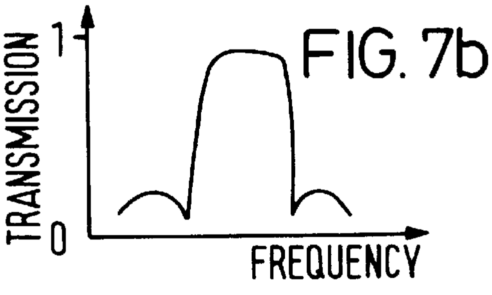
Figure 7C:
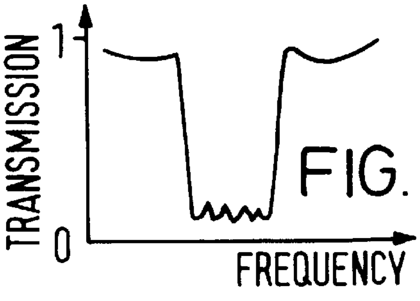
Figure 8:
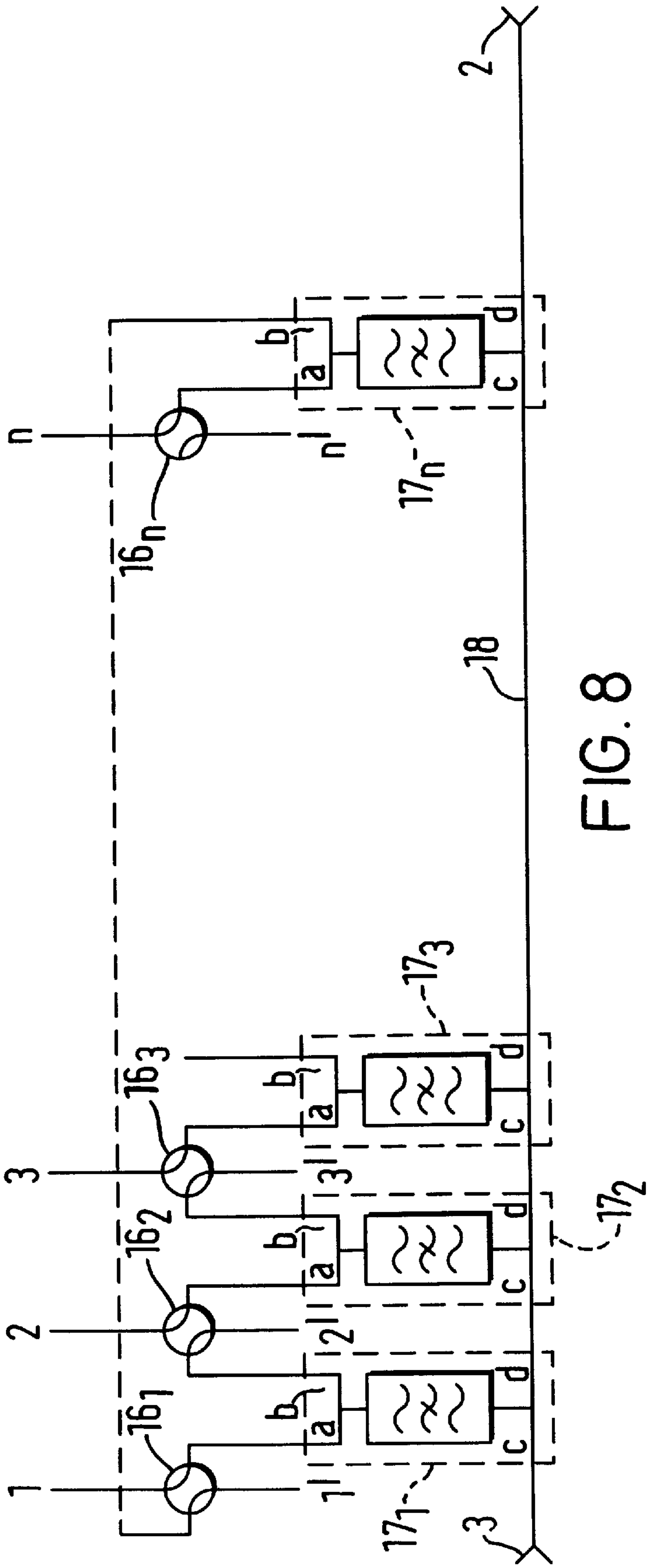
Figure 9A:
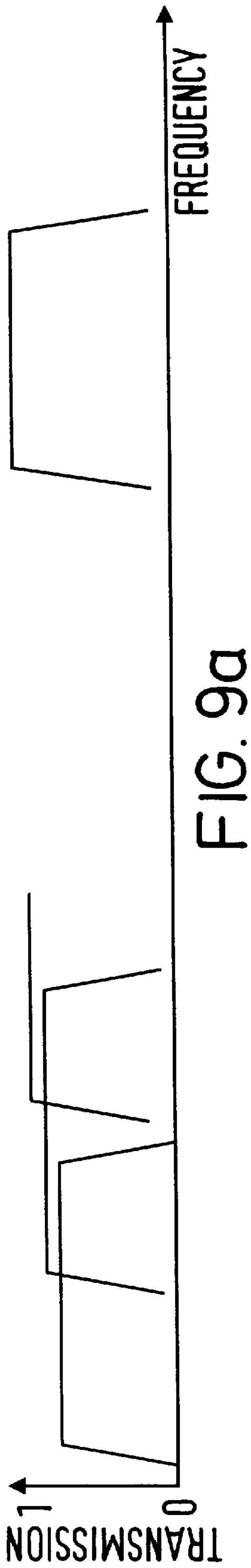
Figure 9B:
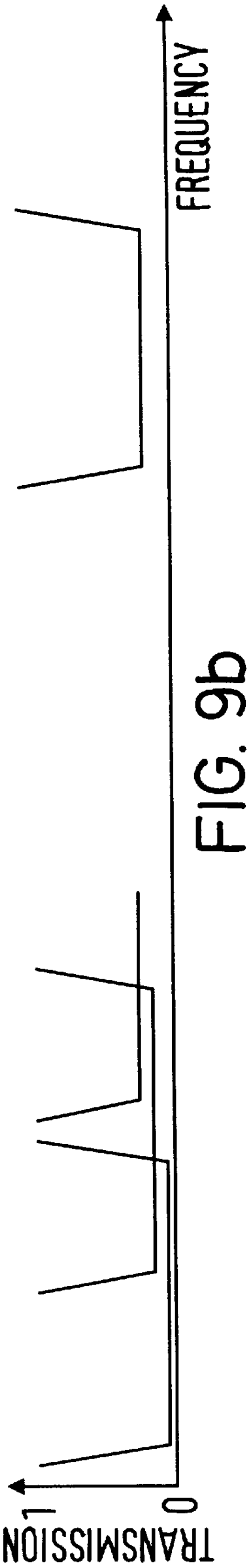
Figure 9C:
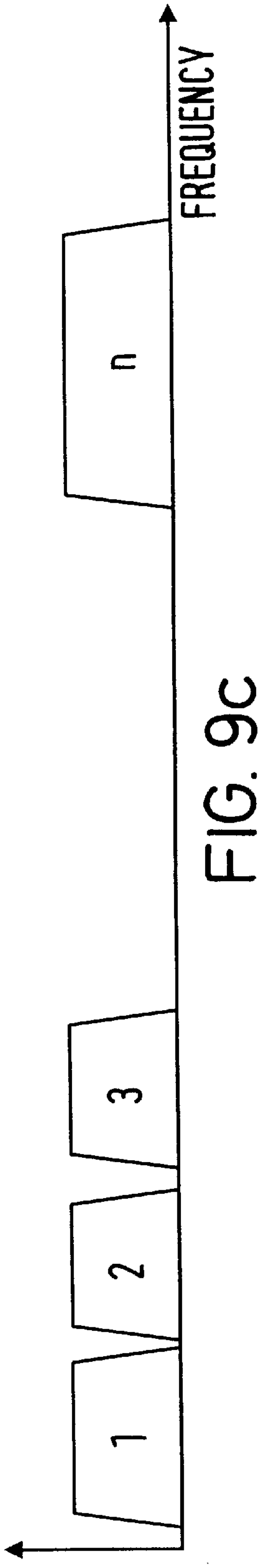
Figure 10:
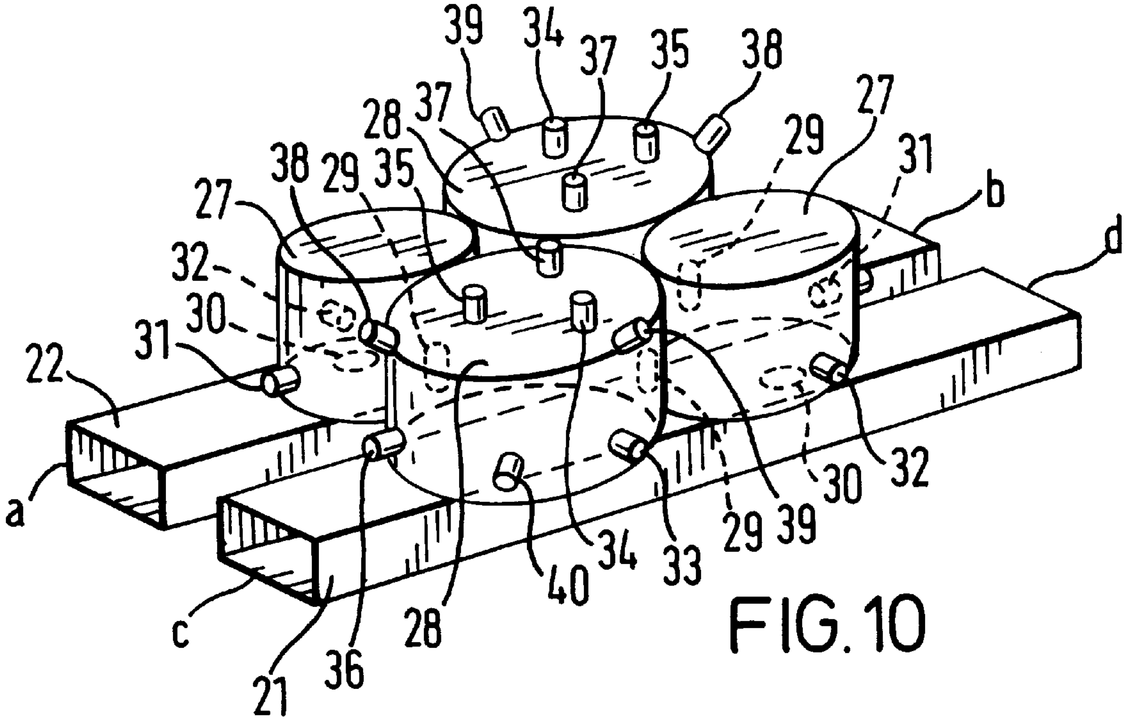
Figure 11:
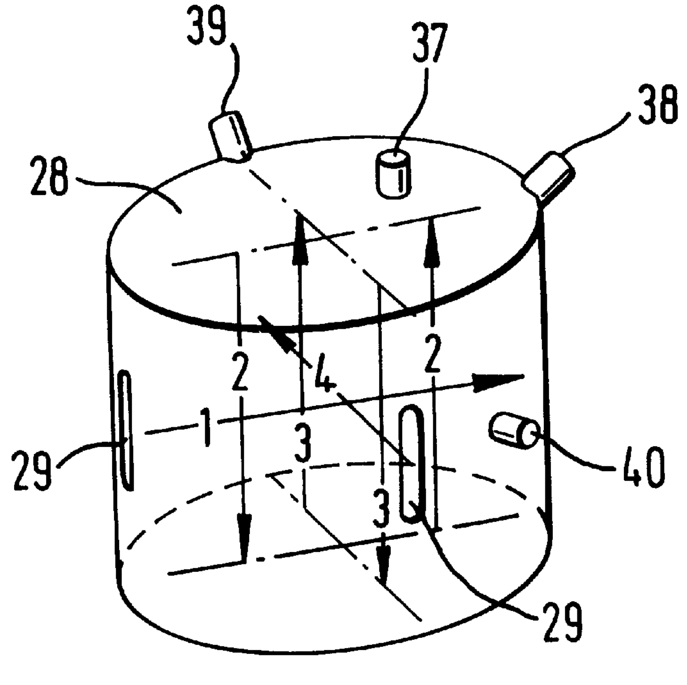
Figure 12:
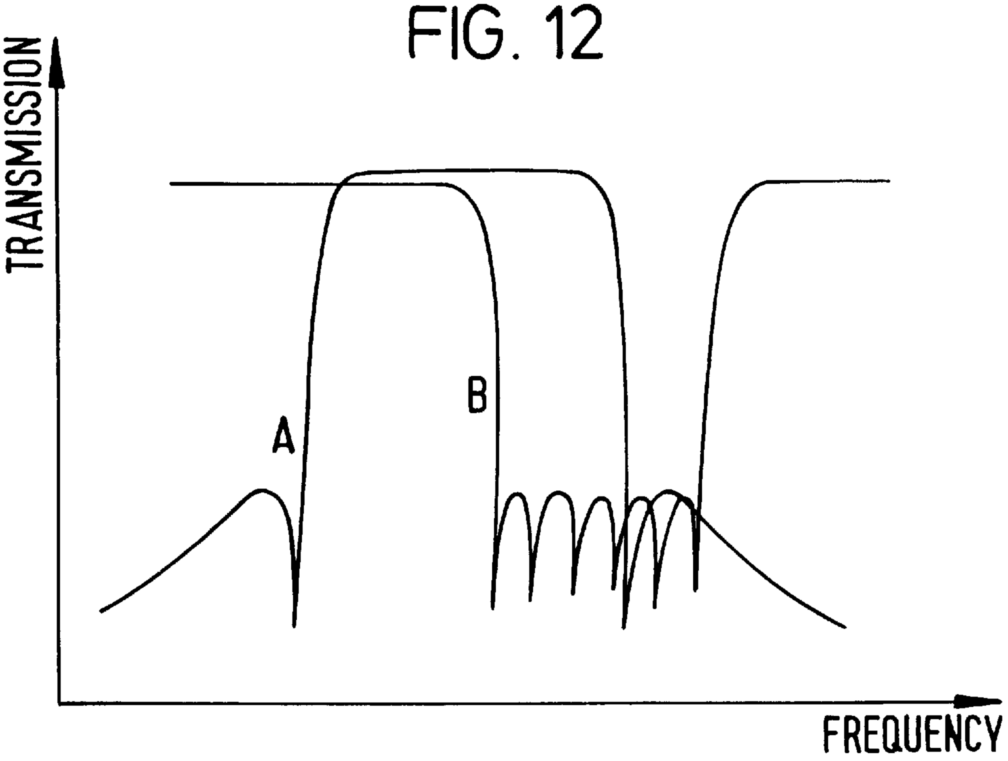
Figure 13:
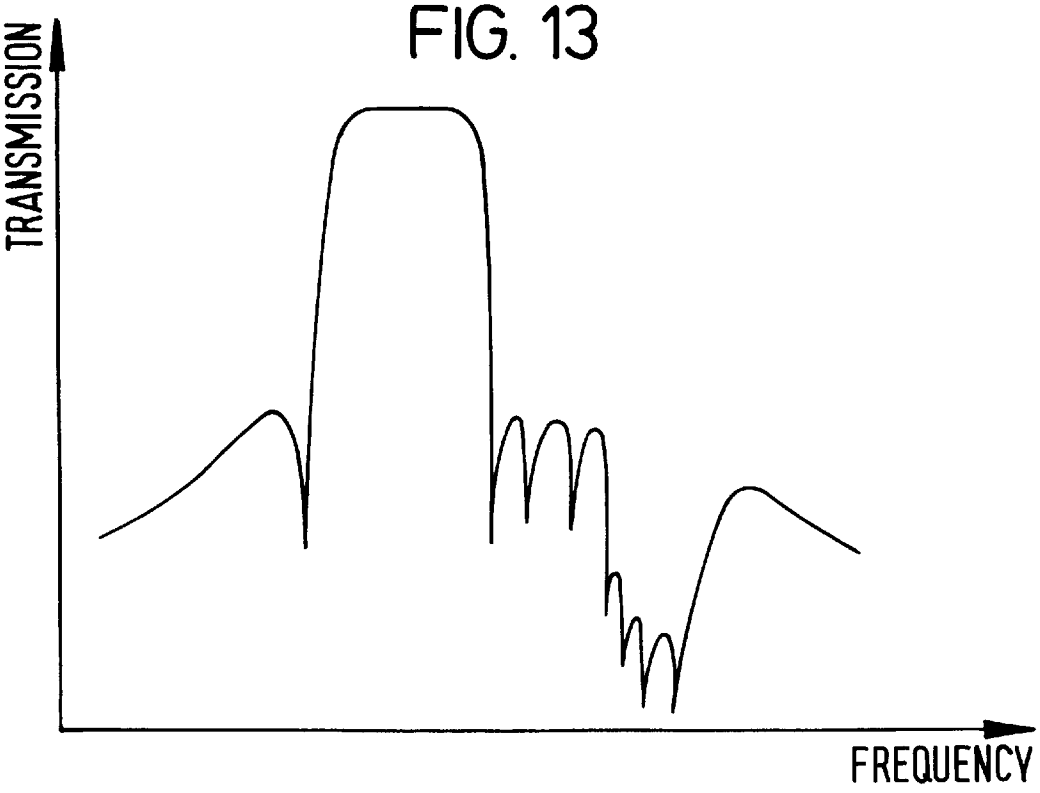

FIG. 7*a* shows one of the directional filters of FIG. 5 in more detail;

FIG. 7*b* shows the filter pass-band response from port a to d, and b to c, and vice versa;

FIG. 7*c* shows the filter band stop response from port a to b, and from port c to d, and vice versa;

FIG. 8 shows the circuit of an output multiplexer in accordance with the invention;

FIG. 9*a* shows the pass-band response of the directional filters of the output multiplexer of FIG. 8 from port a to d, or port b to c;

FIG. 9*b* shows the band-stop response of the directional filters of the output multiplexer of FIG. 8 from port c to d or vice versa;

FIG. 9*c* shows the corresponding channels of the FDM multiplex produced by the output multiplexer of FIG. 8;

FIG. 10 is a perspective view of one form of directional filter suitable for use in the output multiplexer of FIG. 8;

FIG. 11 shows one of the cavities of the directional filter shown in FIG. 10;

FIG. 12 shows the pass-band and stop-band response corresponding to various ports of the directional filter; and FIG. 13 shows the overall response resulting from the two responses shown in FIG. 12.

Throughout all the drawings, like reference numerals have been given to like parts.

Figure 1:
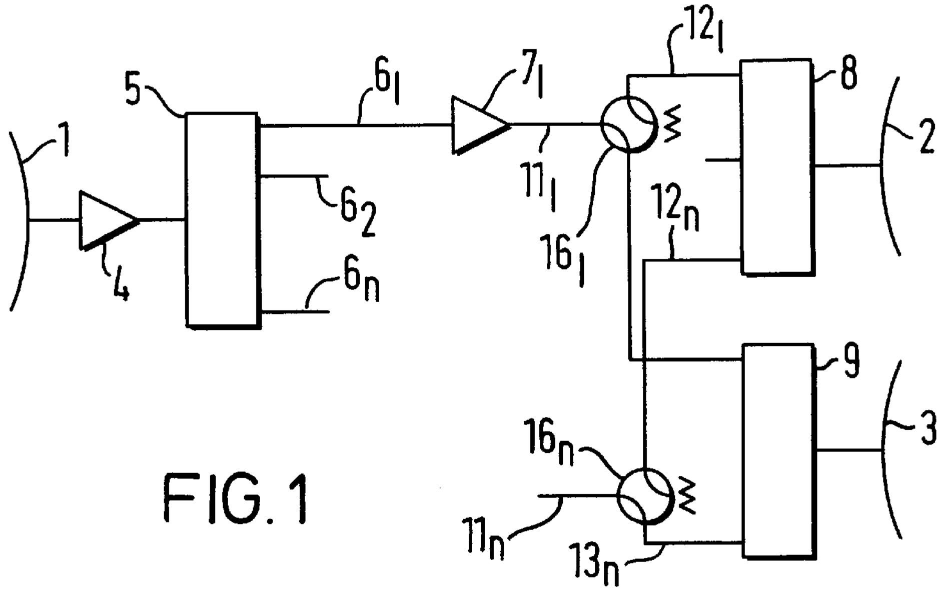
FIG. 1 illustrates a known satellite on-board repeater including two output multiplexers.
Figure 2:
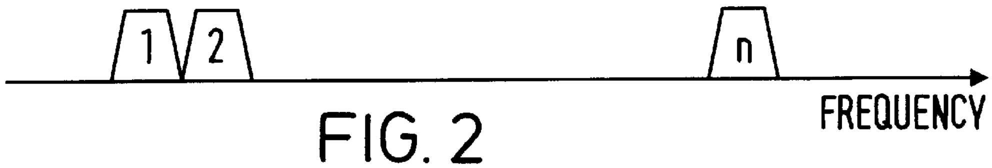
FIG. 2 illustrates schematically a frequency division multiplex.
Figure 4:
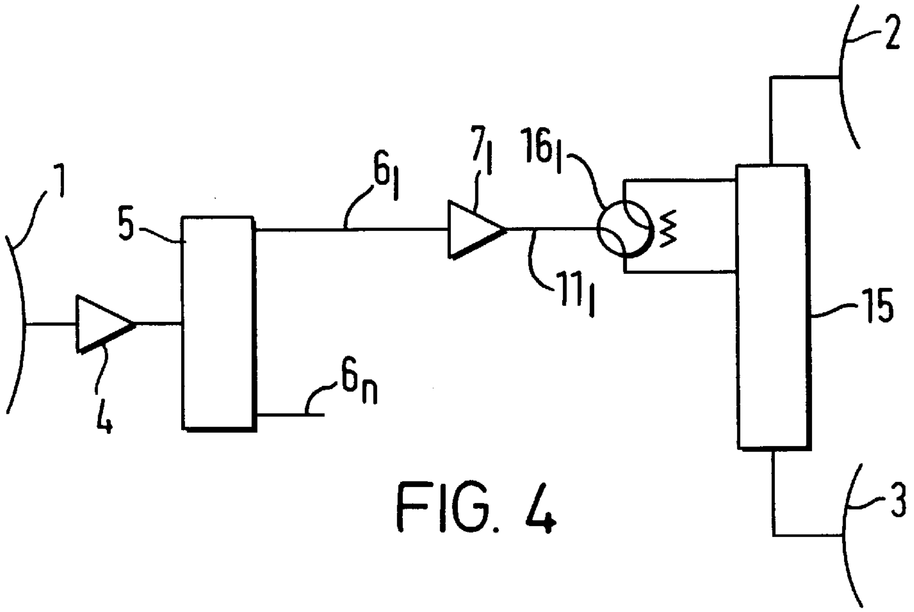
FIG. 4 shows a known satellite on-board repeater including a single directional output multiplexer.
Figure 3:
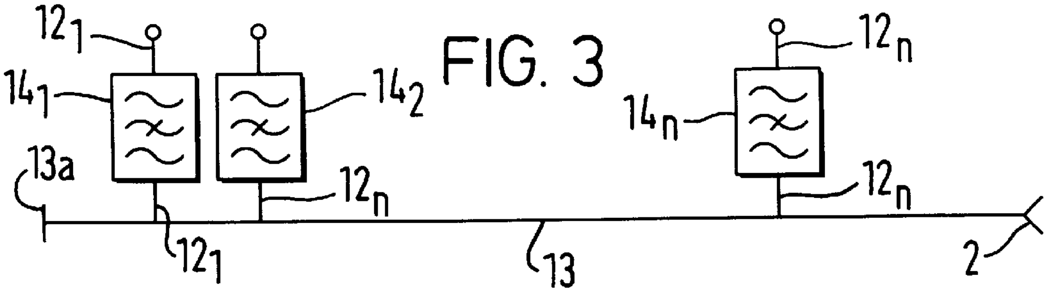
FIG. 3 shows the circuit of the output multiplexers of FIG. 1.

The satellite on-board processing system which includes the output multiplexer is as shown in FIG. 4 of the drawings. The output multiplexer (FIG. 8) consists of a transmission line in the form of a waveguide 18 connected to transmit antenna 2 at one end and a transmit antenna 3 at the other end. The multiplexer also includes n directional filters $17_1$–$7_n$, which are supplied via switches $16_1$–$16_n$ which in turn are connected by waveguide to respective travelling wave tube amplifiers $7_1$–$7_n$ which output the channels demultiplexed from the demultiplexer 5 of FIG. 4. It is assumed that only channels 1-n are connected, channels 1'-n' will be referred to hereinafter.

In accordance with the invention, the filtering operation for each channel (apart from the nth filter when antenna 2 is used and the first filter when antenna 3 is used) is performed by two directional filters and not one as hitherto. Thus, the pass-band of directional filter $17_1$ from terminal a to terminal d (FIG. 9*a*) is approximately twice the desired width of the signal channel 1 (FIG. 9*c*), so that the signal passing along the waveguide 18 towards directional filter $17_2$ actually overlaps signal channel 2. However, the frequency response of directional filter $17_2$ between terminals c and d is a band-stop response (FIGS. 7*c* and 9*b*). The lower frequency transition of the first channel 1 (FIG. 9*c*) is thus defined by the lower frequency transition of the pass-band of the first filter $17_1$, whereas the higher frequency transition of the first channel 1 is defined by the lower frequency transition of the band stop response of the second filter $17_2$.

Because the pass-bands and stop bands of the filters are greater than hitherto, group delay is reduced, which means that there is reduced amplitude variation.

Figure 6:
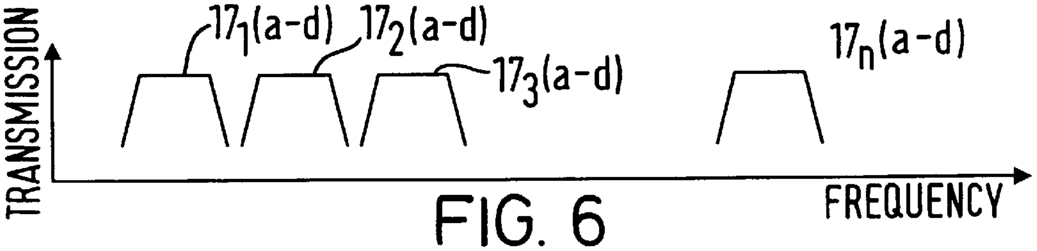
FIG. 6 shows the corresponding pass-bands of the directional filters of the output multiplexer of FIG. 5.

Each directional filter has a pass-band from a–d (or from b–c), and a band stop response from c–d or d–c with the same transition regions. The difference from the prior art arrangement of FIGS. 5 and 6 is that each pass-band/band stop region is wider in relation to the channel than hitherto (in this case, twice as wide), and adjacent pass-band/band stop regions overlap each other.

The second channel 2 is defined in the same way as for the first channel, ie. by directional filters $17_2$ (lower frequency edge) and by directional filters $17_3$ (higher frequency edge). It will be observed that the last channel n will therefore be twice as wide as the other channels, since there is no adjacent band stop.

The resulting FDM (FIG. 9*c*) is fed to antenna 2 for transmission.

It will also be observed that the configuration of FIG. 8 also lends itself to transmission to antenna 3. In this case, inputs 1' to n' of the switches $16_1$ to $16_n$ are used in place of inputs 1-n. In this case, the first channel will be of twice the normal width, and the last channel n will be of normal width. Thus, filter $17_n$ receives input 1', which passes into port b and out of port c. This will define the higher frequency transition of the channel n. The lower frequency transition will be defined by the upper frequency transition of the band-stop of filter $17_{n-1}$. The other channels will be defined in the same way, except for channel 1 (derived from input 2' and directional filter $17_2$), which will be of twice the width of the other channels since there is no succeeding band stop. This time the FDM is launched from antenna 3.

In fact, while the n' inputs produce n channels, in fact they do not occupy the frequency slots of their counterparts the inputs n. Thus, to take filter $17_2$ as an example, when the inputs n are present, its output (from input 2) falls in channel slot 2 (pass-band of $17_2$ and band stop of $17_3$), whereas when the inputs n' are present, its input (actually 3') now leaves port c and occupies channel slot 3 (pass-band of $17_2$ but band stop of $17_1$).

It follows that each directional filter can be fed with two different channel slots simultaneously, and both antennas 2, 3 can be used simultaneously, each using the same set of frequency slots (apart from the differences at the ends noted above). Provided the antennas are directed at different regions of the earth, twice as many signals can be broadcast as with the prior configuration of FIG. 5, for the same number of filters and the same number of switches. (It would not be possible to feed both inputs of each filter of FIG. 5 with signals occupying the same frequency slot to achieve the same result because there would be unacceptable crosstalk between the signals in the filters).

A practical implementation of the directional filter 17 is shown in FIGS. 10 and 11.

FIG. 10 shows the general arrangement of the four-port directional filter when implemented using multimode cavity resonators. The inputs a, b are connected to respective switches $16_1$, $16_2$ etc, and the outputs c, d are joined to the outputs c, d of the next adjacent directional filters by extensions of the waveguide i.e. the output waveguide 18 is a continuous length of waveguide which includes a section c-d as shown in FIG. 10 for each directional filter.

The directional filter is formed by an input waveguide 22 and a parallel waveguide 21 which are interconnected by cylindrical cavity resonators 27 and 28 so that two distinct paths co-exist. The paths illustrated in the figure are, firstly, from input dual-mode resonator 27, coupled to the input waveguide 22, to quadruple-mode resonator 28, located on the output waveguide 21, then through to output dual-mode resonator 27, coupled to the output waveguide 21; secondly, input dual mode-resonator 27, coupled to the input waveguide 22, then to quadruple-mode resonator 28, located on the input waveguide 22, then to output dual-mode resonator 27, coupled to the output waveguide 21.

Other than the routing, the two paths should have identical electrical characteristics particularly in respect of signal phase shift and group delay. Physically, the arrangement illustrated is not a definitive embodiment, in terms of relative sizes and/or aspect ratio, but typifies the interconnection of a separate input and output waveguide with means which create two distinct filter paths each using at least one quadruple-mode cavity coupled only with longitudinal slots.

In the particular embodiment of the invention illustrated in FIG. 10, cavity resonators 27 and 28 are of the form of right circular cylinders closed off at both ends. The input and output waveguides 22 and 21 are conventional rectangular conducting tubes suitably dimensioned so as to allow electromagnetic propagation in the dominant $TE_{10}$ waveguide mode. The input waveguide 22 has a pair of opposing ends a and b which serve as inputs of the directional filter and are used depending on the required signal flow direction through the filter. Similarly, the output waveguide 21 has a pair of opposing ends c and d which serve as outputs from the directional filter depending on the required signal flow direction through the filter.

In operation, an electromagnetic wave, whose frequency falls in the pass-band of the filter, is input to one of the ends a, b of the input waveguide 22 and the filtered wave emerges from one of the opposing ends c, d of the output waveguide 21. Alternatively, when an electromagnetic wave, whose frequency does not fall in the pass-band of the filter, is input to one of the opposing ends of the input waveguide, it emerges only from the opposite end of the input waveguide to which it was input and so is passed on, unaffected, as an input to another such filter. Like the output waveguide, the input waveguide is also a continuation of the waveguide sections a, b.

A number of such filters are interconnected and both the input or output waveguides form a travelling wave manifold. This is illustrated in FIG. 8 representing an output multiplexer.

The circular dual-mode cavity resonators 27 are dimensioned so as to support a $TE_{111}$ circularly polarised waveguide mode. Coupling into the input cavity 27, from the input rectangular waveguide 22, and out of the output cavity 27, into the output rectangular waveguide 21, is via an aperture suitably located to couple equal amounts of energy from the longitudinal and transverse components of the rectangular waveguides $TE_{10}$ dominant mode. This coupling aperture may be a simple circular hole 30 or another more complex aperture structure, as long as the resulting coupled components in the circular cavity resonator have a quadrature relationship in both time and space. A pair of longitudinal coupling slots 29, located in the cylindrical wall of input cavity resonator 27 and energised by the magnetic field of the electromagnetic wave therein, have an orthogonal relationship so that the $TE_{111}$ circular polarisation is decomposed into two coupling signals which are in phase quadrature. These signals are the means of providing separate paths through the filter each being coupled into one of two quadruple-mode cavity resonators 28 the outputs of which are similarly coupled, by similar longitudinal slots 29, to the output cavity resonator 27 where the two signals are again recombined into a $TE_{111}$ circularly polarised wave. This wave is finally coupled into the output rectangular waveguide via a coupling aperture 30 which may be a simple circular hole or another more complex aperture structure.

The mode configuration of the two quadruple-mode cavity resonators is illustrated in FIG. 11 which shows arrows numbered 1–4 indicating the electric vectors of the four independent linearly polarised and orthogonal waves therein. The cavity must be suitably dimensioned so that it will support a pair of orthogonal $TE_{11N}$ modes and a pair of orthogonal $TM_{110}$ modes. Here, N can be any convenient integer value. Also shown is the input and output longitudinal slots $29_1$ and $29_2$ respectively, orthogonally disposed and located in the cylindrical cavity wall, together with four additional couplings 37, 38, 39 and 40 formed by simple capacitive posts, or screws. Operationally, the magnetic field coupled from slot $29_1$ will couple into the first $TE_{11N}$ mode-1. Inclusion of coupling post, or screw, 38, at 45° to a common plane and at the intersection of the cylindrical wall and the cavities closed end, will further excite the first $TM_{110}$ mode-2. Inclusion of the post, or screw, 37 suitably positioned in the closed end of the cylindrical cavity, will energise the second $TM_{110}$ mode-3. Finally, the inclusion of the coupling post, or screw, 39, at 45° to a common plane and at the intersection of the cylindrical wall and the closed end of the cavity, will couple into the second, and last, $TE_{11N}$ mode-4. The energy of this fourth mode is coupled out of the cavity via the second longitudinal slot $29_2$ excited by the magnetic field of this mode. The addition of coupling post, or screw, 40 forms a cross-coupling between the first and fourth $TE_{11N}$ modes so that a symmetrical pair of finite frequency transmission zeros is produced.

In the general arrangement, shown in FIG. 10, additional capacitive posts, or screws, 31, 32, 33, 34, 35 and 36 are provided to ensure that each mode is tuned to the same resonant frequency enabling synchronism to be achieved through each of the two filter paths. Each separate filter path, from input waveguide 22 to output waveguide 21, therefore makes use of at least one longitudinal, or transverse, resonance in the first dual-mode cavity 27, two TE and two TM modes in one of the quadruple-mode cavities 28, and one transverse, or longitudinal, resonance in the second dual-mode cavity 27. A symmetric pair of finite frequency transmission zeros is additionally produced by the cross-coupling post, or screw, 40 in the quadruple-mode cavity 28. Therefore, each path provides for at least six transmission poles together with a symmetric pair of finite frequency zeros, known as a quasi-elliptic transmission function, without the need for a cross-coupling via a separate cross-coupling aperture or slot.

As has been previously described, it is desirable that, in a travelling wave manifold arrangement, the individual directional filter pass-bands overlap. This technique can be more easily understood by considering an output multiplexer, using four-port directional filters, as diagrammatically represented in FIG. 8 where all inputs b are terminated with reflection-less loads and signal inputs into a, at frequency $f_r$, are directed to output d on the manifold.

The transmission function for filter $17_1$, from $a_1$ to $d_1$, may be represented by the quasi-elliptical band-pass response as indicated by trace A in FIG. 12. Due to the presence of the reflection-less termination port b of directional filter $17_2$, the transmission function from c to d at directional filter $17_2$, assuming a similar quasi-elliptical band-pass response for $17_2$ as for $17_1$ except for a displacement in pass-band centre frequency, will be that known as a band stop response typified by trace B in FIG. 12. If the overlap in responses is equal to approximately half the transmission bandwidth then the overall transmission response from input a of $17_1$ to d of $17_2$ will be the product of A and B as shown in FIG. 13. Note that the new pass-band width is approximately half that of the original filter, the stop band response zeros of filter $17_2$ have become transmission zeros in the overall response of filter $17_1$, and the high frequency roll-off region is entirely defined by the stop band characteristic of the next adjacent directional filter.

It is found that a band-pass transmission response so produced provides for a number of advantages over conventional methods of channel definition, in terms of maintenance of signal fidelity provided by the transmission path from any input to the common output of the multiplexer, in as much as for the same shape factor, or selectivity, reduced pass-band amplitude and group delay variation is obtained.

This process of pass-band definition by overlapping pass-bands described is extendible to include as many channels as is deemed necessary to make a functioning frequency division power combining manifold.

The reciprocal nature of the technique also provides for an exactly similar process when the manifold is used in the reverse direction so as to provide a frequency division demultiplexer. This, in FIG. 8, antenna 3 could be a receive antenna providing an FDM signal which, after low-noise amplification, would be fed along waveguide 18 and divided into respective signal channels 1-n. In this example, channel 1 would be defined by the full pass-band width of directional filter $17_1$, with signal energy entering port c and emerging from port b and thence from port 2' of switch $16_2$. Channel 2 would be defined by the part of the pass-band response of directional filter $17_2$ which does not coincide with the band-stop response, from port c to d, of directional filter $17_1$. Thus, for filters the centres of which increase with frequency in ordinal sequence, channel 2 is defined by the lower frequency corresponding to the upper stop-band edge of directional filter $17_1$, and the upper frequency corresponding to the upper pass-band of directional filter $17_2$. Therefore, received signals whose frequency components fall between these two limits are unaffected by the band-stop response of directional filter $17_1$, and so enter port c to emerge from port b of directional filter $17_2$ and thence from port 3' of switch $16_3$.

If antenna 2 receives the FDM of signals, the channels are similarly divided into respective channels n-1 but emerge from ports a and thence from the ports 1-n of switches $16_n$- $16_1$. In this case channel n is defined by the full pass-band width of directional filter $17_n$ whilst the remaining channels become defined as described previously.

The invention is not restricted to directional filter illustrated in FIG. 10. Thus, the directional filter described in EP 0 249 612B could be used, or other types could be used.

Typical frequencies of operation are microwave eg. 30 MHz to 300 GHz.

It is not necessary for each channel to represent one signal only. Two signals could be contained in one channel or, more generally, the channel could be digital, for example, time division multiplexed data.

Also, it is not necessary for the filters to be physically positioned in the order of the channels they define. They could be physically positioned in any order, and the channels will be unaffected.

We claim:

1. A multiplexer for producing an FDM of RF signal channels, comprising a transmission line, a plurality of directional filters by means of which respective signals can be coupled onto the transmission line, wherein at least one of the channels of the resulting FDM on the transmission line is defined at one edge by the band-pass response of the directional filter coupling the respective signal onto the transmission line and at the other edge by the band stop response of another directional filter for coupling another signal onto the transmission line.

2. A multiplexer as claimed in claim 1, in which each directional filter has a pair of input ports for signals, and a pair of output ports coupled to the transmission line, there being a band-pass characteristic from each input port to a respective output port and a corresponding band stop characteristic between the output ports, the pass and stop bands for one directional filter partly overlapping those for another directional filter.

3. A multiplexer as claimed in claim 2, in which at least one directional filter includes a first length of transmission line, opposed ends of which form two input ports, and a second length of transmission line, opposed ends of which form two output ports.

4. A multiplexer as claimed in claim 1, in which the bandwidth of the band-pass response is greater than the bandwidth of the signal channels.

5. A multiplexer as claimed in claim 4, in which the bandwidth of the band-pass response is approximately twice the bandwidth of the said at least one signal channel.

6. A multiplexer as claimed in claim 1, in which the directional filter includes a cavity resonator with quadruple resonance modes.

7. A multiplexer as claimed in claim 6, in which the cavity resonator is cylindrical with closed top and bottom ends, and a pair of plane polarised modes with orthogonal electric vectors propagate axially in each direction.

8. A multiplexer as claimed in claim 7, in which slots which only extend longitudinally parallel to the axis of the cavity resonator couple the quadruple resonance mode cavity resonator from a dual mode cavity.

9. A demultiplexer for producing RF signal channels from an FDM, comprising a transmission line, a plurality of directional filters by means of which respective signals can be coupled out of the transmission line, wherein at least one of the resulting channels is defined at one edge by the band pass response of the directional filter coupling it out of the transmission line and at the other edge by the band stop response of another directional filter for coupling out another signal from the transmission line.

10. A demultiplexer as claimed in claim 9, in which each directional filter has a pair of input ports coupled to the transmission line, and a pair of output ports for signal channels, there being a band pass characteristic from each input port to a respective output port and a corresponding band stop characteristic between the input ports, the pass and stop bands for one directional filter partly overlapping those for another directional filter.

11. A demultiplexer as claimed in claim 10, in which the bandwidth of the band pass response is approximately twice the bandwidth of the said at least one signal channel.

* * * * *